United States Patent [19]

Ohsugi et al.

[11] Patent Number: 5,674,569
[45] Date of Patent: Oct. 7, 1997

[54] METHOD OF FORMING MULTILAYER COATINGS ON A SUBSTRATE

[75] Inventors: Hiroharu Ohsugi, Hirakata; Hisaki Tanabe, Yawata; Yoshitaka Okude, Hirakata, all of Japan

[73] Assignee: Nippon Paint Co., Ltd., Osaka, Japan

[21] Appl. No.: 521,652

[22] Filed: Aug. 31, 1995

[30] Foreign Application Priority Data

Sep. 1, 1994 [JP] Japan ................................. 6-232270

[51] Int. Cl.$^6$ .............................. B05D 1/36; B05D 1/38; B05D 7/16
[52] U.S. Cl. ........................................ 427/407.1; 427/410
[58] Field of Search .............................. 429/409; 427/410, 427/407.1

[56] References Cited

U.S. PATENT DOCUMENTS

| | | | |
|---|---|---|---|
| 4,603,064 | 7/1986 | Kania | 427/410 |
| 5,017,221 | 5/1991 | Legrow et al. | 106/10 |
| 5,250,647 | 10/1993 | Herzig | 528/15 |
| 5,254,606 | 10/1993 | Mikami | 427/407.1 |
| 5,321,082 | 6/1994 | Ohsugi et al. | 525/101 |
| 5,322,714 | 6/1994 | Kato et al. | 427/409 |
| 5,324,807 | 6/1994 | Yamada et al. | 528/100 |
| 5,366,768 | 11/1994 | Kasari et al. | 427/410 |
| 5,409,995 | 4/1995 | Iwahara et al. | 525/100 |
| 5,413,809 | 5/1995 | Hazan | 427/409 |
| 5,416,147 | 5/1995 | Takarada et al. | 524/399 |
| 5,424,383 | 6/1995 | Kimura et al. | 528/12 |

*Primary Examiner*—Diana Dudash
*Attorney, Agent, or Firm*—Millen, White, Zelano & Branigan, P.C.

[57] ABSTRACT

A method of forming multilayer coatings including a pigmented base coat layer applied on a substrate such as automobile bodies comprises applying, as an outermost layer, a clear coat composition comprising (a) a resin having pluralities of hydrosilyl groups and alkenyl groups in the molecule or a blend of resins having a plurality of hydrosilyl groups in the molecule and a plurality of alkenyl groups in the molecule, respectively, and (b) a compound catalyzing the addition reaction of the hydrosilyl group to the alkenyl group.

18 Claims, No Drawings

METHOD OF FORMING MULTILAYER COATINGS ON A SUBSTRATE

BACKGROUND OF THE INVENTION

This invention relates to a method of forming multilayer coatings on a substrate such as automobile bodies.

The exterior of automobiles and passenger cars in particular is finished with multilayer coatings comprising a pigmented base coat and a clear top coat thereon. The top coat is aimed mainly to impart cars with a high quality appearance and also to preserve the appearance for long period of time. To this end various properties are required for the top coat including high weatherability with prolonged retention of high gloss, high scratch resistance to washer brushes, high resistance to chemicals such as acids or alkalis, and high cleanability from tar, dust and other soiling substances. Predominantly used today for this purpose are solvent type compositions containing an acrylic polymer having a plurality of hydroxyl groups and a crosslinking agent such as melamine resins or organic polyisocyanates. However, the melamine resin-crosslinking compositions require relatively high baking temperatures and are susceptible to volumetric shrinkage owing to the emission of lower alkanols used for etherifying the methylol groups of the melamine resin. Moreover, cured films thereof often exhibit decreased weatherability and a decreased acid rain resistance due to the triazine ring contained in the melamine resin. The polyisocyanate-crosslinking compositions have problems of toxicity, decreasing weatherability with time and yellowing.

Recently the use of solvent type coating compositions are subject to restrictive regulations for ecological reasons. Solvent-free powder coating compositions and waterborne compositions are not usable in the clear top coat because of their impaired appearance.

A need exists, therefore, for a multilayer coatings capable of eliminating or ameliorating the foregoing defects of prior art methods.

SUMMARY OF THE INVENTION

Commonly assigned Japanese Patent Applications JP-A-3/2776450, JP-A-7/011141 and JP-A-7/157522 disclose a resinous composition curable through the addition reaction of hydrosilyl group to carbon-to-carbon double bond (hydrosilylation reaction). Because the chemical bond newly created by the addition reaction is a chemically stable carbon-to-silicon bond and the hydrosilylation crosslinker has a relatively low cohesive force, solvent-free or ultra-high solids coating compositions can be formulated from said resin composition for use in forming a top or over coat of multilayer coatings having improved performance, while eliminating or substantially reducing the emission of organic solvents to the atmosphere when used in finishing automobile bodies and the like. Because the inventive top coat composition can be applied on either solvent type or waterborne base coats and baked simultaneously with or separately from the base coat as desired, it is not necessary to change or re-design existing coating lines.

The present invention provides a method of forming multilayer coatings on a substrate such as automobile bodies. In one aspect, the method comprises the steps of applying a pigmented base coat composition onto said substrate, applying a clear top coat composition onto the base coat, and curing both coats individually or simultaneously, wherein said clear top coat composition comprises (a) a resin having pluralities of both hydrosilyl groups and alkenyl groups in the molecule, or a blend of resins having a plurality of hydrosilyl groups in the molecule and a plurality of alkenyl groups in the molecule, respectively; and (b) a catalytically effective amount of a hydrosilylation catalyst.

In another aspect, the method comprises the steps of applying a pigmented base coat composition onto said substrate, applying a clear top coat composition onto the base coat, curing both coats individually or simultaneously, applying a clear over coat composition onto the top coat, and curing the over coat, wherein said clear over coat composition comprises (a) a resin having pluralities of both hydrosilyl groups and alkenyl groups in the molecule, or a blend of resins having a plurality of hydrosilyl groups in the molecule and a plurality of alkenyl groups in the molecule, respectively; and (b) a catalytically effective amount of a hydrosilylation catalyst.

DETAILED DESCRIPTION OF THE PREFERRED EMBODIMENTS

Base coat compositions

The base coat compositions usable in the present invention may be the same as those known in the prior art used for finishing automobile bodies and the like. They are classified into acrylic and polyester (including alkyd) types depending upon the type of film-forming resins, into solvent and waterborne types depending upon the type of liquid medium, and also into metallic and solid color types depending upon the type of pigments. Any of these types may be used in the present invention.

The base coat composition generally contain a film-forming acrylic or polyester resin having a plurality of functional groups such as hydroxyl or carboxyl, a crosslinker reactive with said functional groups, and a pigment. The film-forming acrylic and polyester resins are well-known in the art. Crosslinkers are also well-known in the art and include an organic polyisocyanate and aminoplast resin such as melamine resins. Other systems having a different crosslinking mechanism may also be used in the base coat composition. For example, a system relying on a hydrosilylation reaction as the crosslinking mechanism thereof, as will be described below in relation to the top or over coat composition, may be used in the base coat composition.

Typical examples of pigments used in the base coat composition are coloring pigments such as carbon black, titanium dioxide, lead white, graphite, zinc sulfide, zinc white, chromium oxide, zinc chromate, strontium chromate, barium chromate, nickel-titanium yellow, chromium-titanium yellow, yellow ferric oxide, red ferric oxide, black ferric oxide, phthalocyanine blue, phthalocyanine green, ultramarine blue, quinacridone lakes, indanthron lakes, isoindolinone lakes, perylene lakes, anthrapyrimidine lakes, benzimidazolone lakes, cadmium sulfide and diketopyrrolopyrrole lakes; brilliant or metallic glamor pigments such as various metal flakes, titanium oxide-coated mica flakes, cobalt sulfide, manganese sulfide, titanium sulfide and flaky phthalocyanine blue; and extender pigments such as calcium carbonate, magnesium carbonate, silica, silicates, hydrated aluminum oxide, calcium sulfate, talc and clay. The proportion of pigments in the base coat composition is such that the weight ratio of pigments to the combined weight of the film-forming resin and crosslinker as solids ranges from 0.01:1 to 1:1, preferably from 0.03:1 to 0.9:1.

Top coat and over coat compositions

The resinous component of the top or over coat compositions when they form the outermost layer, are systems curable through the addition reaction of hydrosilyl group to the carbon-to-carbon double bond of an alkenyl group. Therefore, the resin system used in the top or overcoat composition of the present invention is either a blend of resins having a plurality of hydrosilyl groups in the molecule and a plurality of alkenyl groups in the molecule, respectively, or self-crosslinkable resin having pluralities of hydrosilyl groups and alkenyl groups in the molecule. Now description will be given in detail first on the blended resins and then on the self-crosslinkable resin. The discussions on the top coat compositions which follow hereinafter equally apply to the over coat composition where they form the outermost layer.

Hydrosilyl group-containing resins

A class of hydrosilyl group-containing resins are organohydrogenpolysiloxanes disclosed in commonly assined JP-A-3/277645, the entire disclosure of which is incorporated herein by reference. The polysiloxanes have one of the following formulas I, II and III:

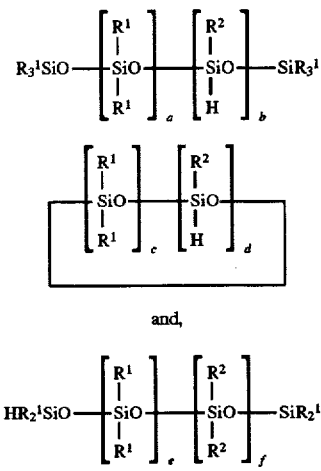

In the above formulas, $R^1$ and $R^2$ are independently a $C_1$–$C_6$ alkyl, phenyl or phenethyl; a is zero or an integer up to 100; b is an integer from 2 to 100; c is zero or an integer up to 8 and d is an integer from 2 to 10 with the proviso that the sum of c+d equals 3 to 10; e is an integer from 2 to 100; and f is zero or an integer up to 100.

Examples of $C_1$–$C_6$ alkyls for $R^1$ and $R^2$ are methyl, ethyl, propyl, butyl and hexyl and their isomeric groups. Methyl and n-propyl are preferable from a commercial point of view. Degree of polymerization of the polysiloxanes of the above formulas are defined by a through f. Because the viscosity increases with the increase of degree of polymerization, excessively high degree of polymerization will adversely affect not only the workability of the top coat composition but also the compatibility with the counter part alkenyl group-containing resin. Polysiloxanes having phenyl groups are preferable for their increased compatibility with the counterpart resin. Thus, particularly preferable specific examples of the above polysiloxanes include methylphenylhydrogenpolysiloxanes and methylpropylhydrogenpolysiloxanes.

Another class of hydrosilyl group-containing resins are homo- or copolymers of a heterofunctional organohydrogenpolysiloxane macromonomer having a (meth) acryloyloxypropyl group attached to the silicon atom disclosed in JP-A-7/011141, the entire disclosure of which is incorporated herein by reference. Macromonomers meeting the above structural requirements are disclosed, in turn, in JP-A-4/169589, the entire disclosure of which is also incorporated herein by reference. Briefly, the macromonomers have one of the following average composition formulas IV, V and VI:

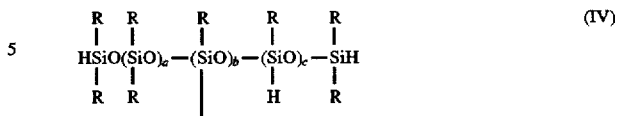

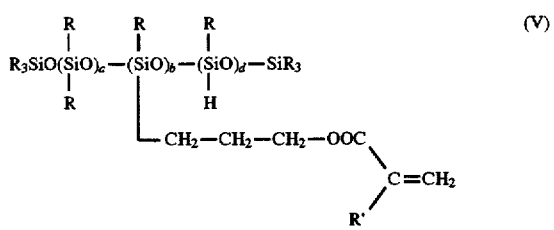

wherein R is a $C_1$–$C_6$ alkyl or phenyl, R' is hydrogen or methyl, a is a real number of from 0 to 20, b is a real number of from 0.5 to 3, and c is a real number of /from 0 to 10;

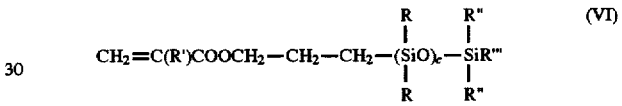

wherein R, R', and a and b are as defined, and d is a real number of from 1 to 10; and $$CH_2=C(R')COOCH_2-CH_2-CH_2-\underset{\underset{R}{|}}{\overset{\overset{R}{|}}{(SiO)_c}}-\underset{\underset{R''}{|}}{\overset{\overset{R''}{|}}{SiR'''}} \quad (VI)$$

wherein R, R' and c are as defined, R" is the same as R or a group—$OSi(R)_2H$, and R'" is hydrogen when R" is the same as R or otherwise a group—$OSi(R)_2H$.

Examples of monomers which are copolymerized with a organohydrogenpolysiloxane macromonomer when include, inter alia, acrylic monomers such as methyl (meth)acrylate, ethyl (meth)acrylate, n-butyl (meth)acrylate, isobutyl (meth) acrylate, t-butyl (meth)acrylate, 2-ethylhexyl (meth) acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth) acrylate, adduct of 2-hydroxyethyl (meth)acrylate andε-caprolactone ( e.g. PLACCEL FM1 sold by Daicel Chemical Industries, Ltd.), glycidyl (meth)acrylate, 3-trimethoxysilylpropyl (meth)acrylate, 3-triethoxysilylpropyl (meth)acrylate, 3-dimethoxymethylsilylpropyl (meth)acrylate (meth)acrylic acid, 2-acryloylamino-2-methylpropanesulfonic acid, acid phosphoxypropyl (meth) acrylate, tributyltin (meth)acrylate, (meth)acrylamide, (meth)acryloylisocyanate, 2-isocyanatoethyl (meth)acrylate and the like. Other copolymerizable monomers include styrene, α-methylstyrene, itaconic acid, maleic acid, vinyl acetate, allyl acetate, vinyltrimethoxysilane, vinyltriethoxysilane, vinylmethyldimethoxysilane, vinylmethyldiethoxysilane and the like.

Conventional solution polymerization method may be employed for producing homo- or copolymers of the macromonomer using a monomeric composition consisting of 20 to 100%, preferably 40 to 100% by weight of the macromonomer and 0 to 80%, preferably 0 to 60% by weight of a monomer copolymerizable therewith. A cured product having a crosslinking density sufficient to exhibit satisfactory mechanical properties would not be obtained at a proportion of the macromonomer less than 20% by weight in the monomeric composition. The resulting homo- or copolymers preferably have a number average molecular weight of from 1,000 to 30,000 and a hydrosilyl group concentration of greater than $1\times10^{-3}$ mol/g. In situ polymerization in a solution of the alkenyl group-containing resin is also possible.

Alkenyl group-containing resin

Alkenyl group-containing resin or polymers used in the present invention preferably have an iodine number of from 50 to 250 and a number average molecular weight of from 300 to 20,000. Specifically, they are an alkenyl group-containing polyether, acrylic, polyester, polycarbonate or epoxy resin.

Alkenyl group-containing polyether resins may be produced by the ring opening polymerization of an alkenyl group-containing epoxide using an active hydrogen compound such as water or mono- or polyols as an initiator. A ring opening polymerization product of allyl glycidyl ether is commercialy available as SANTLINK XI-100 ( number average M.W. 1200, iodine number 212, Monsanto). Ring opening polymerization products of vinylcyclohexane -1,2-epoxide initiated with butanol, allyl alcohol or propargyl alcohol are commercially available as HPE series from Daicel Chemical Industries, Ltd. Also see, Japanese Laid Open (Kokai) Patent Application No. 23829/1992.

HPE-1030(M.W.450,iodine No. 170):

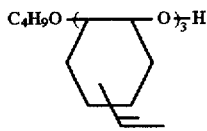

HPE-1060(M.W.820,iodine No. 185):

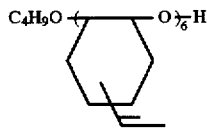

HPE-10601A(M.W.890,iodine No. 170):

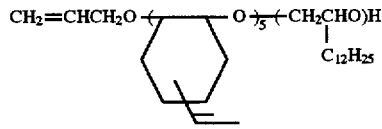

HPE-10602A(M.W.980,iodine No. 130):

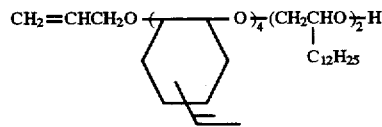

HPE-10601C(M.W.780,iodine No. 196):

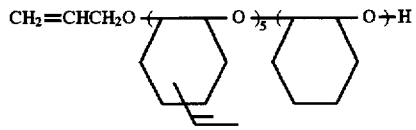

HPE-10602C(M.W.750,iodine No. 170):

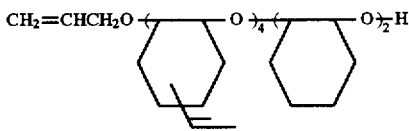

HPE-Pr3(M.W.430,iodine No. 236):

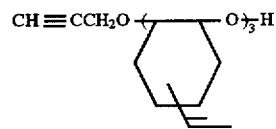

Alkenyl group-containing acrylic resins may be produced by polymerizing an alkenyl group-containing acrylic monomer alone or in combination with other monomers copolymerizable therewith. Examples of alkenyl group-containing acrylic monomers include allyl (meth)acrylate, 2-butenyl (meth)acrylate, 3-methyl-3-butenyl (meth)acrylate, 3-methyl-2-butenyl (meth)acrylate, cyclohexenylmethyl (meth)acrylate, 2-methyl-2-propenyl (meth)acrylate, 3-heptenyl (meth)acrylate, 4-hexenyl (meth)acrylate, CYCLOMER MF-401 (1:1 adduct of 2-hydroxethyl methacrylate and vinylcyclohexene monoepoxide sold Daicel Chemical Industries, Ltd.) and the like. These alkenyl group-containing monomers may be produced by reacting the corresponding alcohols with (meth)acryloyl chloride or transesterifying with an alkyl (meth)acrylate. Alkenyl group-containing monomers produced by reacting an olefin alcohol with (meth)acryloylisocyanate or 2-isocyanatoethyl (meth)acrylate may also be used.

Examples of other monomers which are copolymerized with the alkenyl group-containing acrylic monomer include, inter alia, acrylic monomers such as methyl (meth)acrylate, ethyl (meth)acrylate, n-butyl (meth)acrylate, isobutyl (meth) acrylate t-butyl (meth)acrylate, 2-ethylhexyl (meth)acrylate lauryl (meth)acrylate, phenyl (meth)acrylate, benzyl (meth) acrylate, 2-hydroxyethyl (meth)acrylate, 2-hydroxypropyl (meth)acrylate, 4-hydroxybutyl (meth)acrylate, adduct of 2-hydroxyethyl (meth)acrylate and ε-caprolactone (e.g. PLACCEL FM1 sold by Daicel Chemical Industries, Ltd.), glycidyl (meth)acrylate, 3-trimethoxysilylpropyl (meth) acrylate, 3-triethoxysilylpropyl (meth)acrylate, 3-dimethoxymethylsilylpropyl (meth)acrylate, acrylate, (meth)acrylic acid, 2-acryloylamino-2-methylpropanesulfonic acid, acid phosphoxypropyl (meth) acrylate, tributyltin (meth)acrylate, (meth)acrylamide, (meth)acryloylisocyanate, 2-isocyanatoethyl (meth)acrylate and the like. Other copolymerizable monomers include styrene, α-methylstyrene, itaconic acid, maleic acid, vinyl acetate, allyl acetate, vinyltrimethoxysilane, vinyltriethoxysilane, vinylmethyldimethoxysilane, vinylmethyldiethoxysilane and the like. These non-acrylic monomers are preferably used in a proportion less than 50% by weight.

Other methods for producing alkenyl group-containing acrylic resins include the reaction of hydroxyl group-containing acrylic resins with isocyanates or carboxylic acid anhydrides having the alkenyl function, the reaction of isocyanato group-containing acrylic resins with olefin alcohols, the reaction of carboxyl group-containing acrylic resins with alkenyl group-containing epoxide compounds, and the reaction of epoxide group-containing acrylic resins with an alkenoic acid.

Hydroxyl group-containing acrylic resins may be produced by polymerizing hydroxyl group-containing acrylic monomers such as 2-hydroxyethyl (meth)acrylate, 4-hydroxybutyl (meth)acrylate, or an adduct of 2-hydroxyethyl (meth)acrylate and ε-caprolactone (e.g. PLACCEL FM series), or copolymerizing the hydroxyl group-containing acrylic monomer with copolymerizable acrylic and/or non-acrylic monomers.

Isocyanato group-containing acrylic resins may be produced by polymerizing isocyanato group-containing acrylic monomers such as (meth)acryloylisocyanate or 2-isocyanatoethyl (meth)acrylate, or copolymerizing the isocyanato group-containing acrylic monomer with copolymerizable acrylic and/or non-acrylic monomers.

Carboxyl group-containing acrylic resins may be produced by polymerizing (meth)acrylic acid and/or other carboxylic acid monomers such as itaconic or maleic acid, or copolymerizing the carboxylic acid monomer with copolymerizable acrylic and/or non-acrylic monomers.

Likewise epoxide group-containing acrylic resins may be produced by polymerizing epoxide group-containing acrylic monomers such as glycidyl (meth)acrylate, or copolymerizing the epoxide group-containing acrylic monomer with copolymerizable acrylic and/or non-acrylic monomers.

Examples of isocyanates having an alkenyl function to be reacted with hydroxyl group-containing acrylic resins include (meth)acryloylisocyanate, 2-isocyanatoethyl (meth) acrylate, or allylisocyanate. Examples of carboxylic acid anhydrides having an alkenyl function to be reacted with hydroxyl group-containing acrylic resins include itaconic anhydride, maleic anhydride or tetrahydrophthalic anhydride. Examples of olefin alcohols to be reacted with isocyanate group-containing acrylic resins include allyl alcohol, 3-buten-1-ol, 2-allyloxyethanol, glycerine diallyl ether, cyclohexenemethanol, 3-methyl-2-buten-1-ol, 3-methyl-3-buten-1-ol, 2-methyl-3-buten-2-ol, oleyl alcohol, crotyl alcohol and the like. Allyl glycidyl ether is a typical example of alkenyl group-containin epoxide compounds to be reacted with carboxyl group-containing acrylic resins. Examples of olefin carboxylic acids to be reacted with epoxide group-containing acrylic resins include allylacetic, (meth)acrylic, 2-butenoic, 3-butenoic, crotonic, undecylenic or linoleic acid.

Alkenyl group-containing polyester resins may be produced by the polycondensation reaction of the above-mentioned olefin alcohols, a polyol component and a polycarboxylic acid component. Examples of polyols usable in the polycondensation reaction include ethylene glycol, propylene glycol, 1, 6-hexanediol, diethylene glycol, neopentyl glycol, neopentyl glycol hydroxypivalate, trimethylolpropane, alcoholic hydroxyl group-terminated dimethylsiloxane and the like. Examples of polycarboxylic acids include phthalic anhydride, isophthalic acid, terephthalic acid, adipic acid, azelaic acid, trimellitic acid and the like. A small proportion of monoalcohols or monocarboxylic acids may be incorporated as desired. Alternatively, alkenyl group-containing polyester resins may be produced by reacting a carboxyl group-terminated polyester derived from the above-mentioned polyol and polycarboxylic acid components with an alkenyl group-containing epoxide compound, or reacting a hydroxyl group-terminated polyester with an isocyanate or acid anhydride having an alkenyl function.

Alkenyl group-containing epoxy resins may be produced by reacting, for example, bisphenol A diglycidyl ether with an olefin carboxyl acid as exemplified above, or reacting a hydroxy group-containing epoxy resin with an isocyanate or acid anhydride having the alkenyl function also as exemplified above.

As discussed supra, the above alkenyl group-containing polyether, acrylic, epoxy and polyester resins preferably have an iodine number ranging between 50 and 250, more preferably between 70 and 200, and a number average molecular weight ranging between 300 and 20,000, more preferably between 400 and 10,000. This is because if the iodine number or molecular weight is too low, the resin would be deficient in mechanical strength. Conversely if the iodine number or molecular weight is too high, the resulting film would be too rigid or too viscous to give an acceptable workability. Alkenyl group-containing polyether or acrylic resins are preferable.

The ratio of alkenyl group-containing polymer to hydrosilyl group-containing polymer in the top or over coat composition of this invention is preferably adjusted so that 0.4 to 4 hydrogen atoms attached to the silicon atom are present for each alkenyl group. Within the above range it is possible to obtain a cured product having excellent weatherability, gloss and flexibility. If unreacted hydrosilyl or alkenyl functions remain excessively in the cured product, they would react with moisture or other contaminants to degrade the cured film.

Self-crosslinkable resin

Instead of incorporating into a discrete polymer entity separate from the alkenyl group-containing polymer, the organohydrogenpolysiloxane macromonomer containing a hydrosilyl group and a (meth)acryloyloxypropyl group attached to the silicon atom may be incorporated into a single polymer entity together with an alkenyl function to obtain a polymer that crosslinks itself through a hydrosilylation reaction. To this end a hydrosilyl group-containing macromonomer such as macromonomers of the formula IV, V or VI may be copolymerized with an alkenyl group-containing acrylic monomer and optionally with an ethylenically unsaturated monomer.

Examples of alkenyl group-containing acrylic monomers include allyl (meth)acrylate, 2-butenyl (meth)acrylate, 3-methyl-3-butenyl (meth)acrylate, 3-methyl-2-butenyl (meth)acrylate, cyclohexenylmethyl (meth)acrylate, 2-methyl-2-propenyl (meth)acrylate, 3-heptenyl (meth) acrylate, 4-hexenyl (meth)acrylate, CYCLOMER MF-401 (1:1 adduct of 2-hydroxethyl methacrylate and vinylcyclohexene monoepoxide sold Daicel Chemical Industries, Ltd.), and vinyl-terminated polydimethylsiloxypropyl methacrylate of the formula:

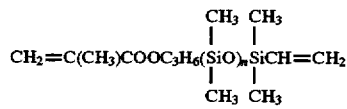

wherein n is an integer of 1–10.

Examples of optional monomers include acrylic monomers such as methyl(meth)acrylate, ethyl(meth)acrylate, n-butyl (meth)acrylate, isobutyl (meth)acrylate, t-butyl (meth)acrylate, 2-ethylhexyl (meth)acrylate, lauryl (meth) acrylate, phenyl (meth)acrylate, benzyl (meth)acrylate, 2-hydroxyethyl (meth)acrylate, 2-hydroxypropyl (meth) acrylate, 4-hydroxybutyl (meth)acrylate, adduct of 2-hydroxyethyl (meth)acrylate and ε-caprolactone ( e.g. PLACCEL FM1 sold by Daicel Chemical Industries, Ltd.), glycidyl (meth)acrylate, 3-trimethoxysilylpropyl (meth) acrylate, 3-triethoxysilylpropyl (meth)acrylate, 3-dimethoxymethylsilylpropyl (meth)acrylate, (meth) acrylic acid, 2-acryloylamino-2-methylpropane sulfonic acid, acid phosphoxypropyl (meth)acrylate, tributyltin (meth)acrylate, (meth)acrylamide, (meth) acryloylisocyanate, 2-isocyanatoethyl (meth)acrylate, a silicone macromonomer sold under the name of SILAPRENE FM-0711 by Chisso Corporation, and a fluorine-containing acrylic monomer of the formula:

wherein R' is hydrogen or methyl, and n is 0-10. Non-acrylic monomers may also be copolymerized. Examples thereof include vinyl acetate, allyl acetate, vinyltrimethoxysilane, vinyltriethoxysilane, vinylmethyldimethoxysilane, vinylmethyldiethoxysilane, N-cyclohexylmaleimide, and N-phenylmaleimide phenylmaleimide.

The proportions of the macromonomer, alkenyl group-containing monomer and optional monomer may vary within a wide range and generally account for 1-99 parts, 99-1 parts and 0-80 parts, respectively, per 100 parts by weight of the mixture thereof. The monomer mixture may conveniently polymerized by the conventional solution polymerization technique. When the alkenyl group-containing monomer contains a terminal ethylenic unsaturation such as allyl methacrylate or 3-butenyl methacrylate, the monomer mixture may be polymerized by the anion polymerization technique or the radical polymerization technique using a chain transfer agent. It is preferable for the resulting copolymers to have a number average molecular weight of 500-100,000.

Alternatively, the alkenyl group may be introduced into a copolymer derived from the hydrosylyl macromonomer and a comonomer containing an appropriate functional group. For example, allyl alcohol or 2-butenol may be reacted with a copolymer containing as monomeric units acrylic or methacrylic acid or with a copolymer containing as monomeric units an isocyanate group-containing monomer such as 2-isocyanatoethyl methacrylate, methacryloylisocyanate or m-isopropenyl- α, α-dimethylbenzylisocyanate. Likewise, acrylic or methacrylic acid may be reacted with a copolymer containing as monomeric units glycidyl methacrylate.

Hydrosilylation catalyst

A hydrosilylation catalyst is required for the curing reaction of the composition of this invention. Usually Group VIII transional metals or their compounds are used. Specific examples thereof include $PtCl_4$; $H_2PtCl_6 \cdot 6H_2O$; platinum vinylsiloxane complex of the formula: Ptn $(ViMe_2SiOSiMe_2Vi)m$ wherein Vi is vinyl, Me is methyl, n and m are an integer; platinum phosphine complex of the formula: $Pt(PPh_3)4$ wherein Ph is phenyl; platinum olefin complex of the formula: $PtCl_2$ (cod) wherein cod is cyclooctadiene; Pt (acac)2 wherein acac is acetylacetonato; trans- or cis-[$PtCl_2(NH_2Pr)_2$]wherein Pr is propyl; $PdCl_2(PPh_3)_2$; $PdCl_2(PhCN)_2$; $RhCl_2(PPh_3)_3$; $RhCl(cod)_2$; $Ru(cpd)_2$ wherein cpd is cyclopentadiene and the like. Other examples of catalysts include ruthenium carbonyl-cluster complexes disclosed in commonly assigned Japanese Patent Application No. 7/136489, and platinum complexes disclosed in JP-A-6/503591 and JP-A-6/503592. The catalyst may be added to the composition as a solution or dilution in a solvent such as alcohols, aromatic or aliphatic hydrocarbons, ketones and basic solvents. Platinum catalysts such as chloroplatinic acid are generally used. The amount of catalyst ranges between 5 and 10,000 ppm, preferably between 20 and 1,000 ppm relative to 100 parts by weight of the solids content of the composition. Excessive addition of catalyst may cause coloring of cured films and is uneconomical because Group VIII metals are generally expensive. The catalyst may be added in combination with an acetylenic compound capable coordinating with platinum to retard its catalytic activity. Examples of such retardants include ethynyl alcohol, propargyl alcohol, 2-methyl-3-butyn-2-ol, 3-trimethylsiloxypropyne, 3-trimethylsiloxy-3, 3-dimethylpropyne, bis(1,1-dimethyl-2-propynyloxy) dimethylsilane, bis(1,1-dimethyl-2-propynyloxy) diphenylsilane, bis(1,1-dimethyl-2-propynyloxy) phenylmethylsilane, polymers of acrylate or methacrylate esters of α, α-dialkylpropargyl alcohol or its ethylene oxide adducts, and alkynyl group-containing acrylic polymers disclosed in JP-A-5/287206.

The top coat composition may be formulated in a solvent free composition or an ultra-high solids composition of higher than 60% nonvolatiles to eliminate or substantially reduce the emission of solvents to the atomosphere. Although the top coat composition is not pigmented, it may contain a variety of conventional additives including viscosity adjusting agents such as organic montmonrillonite, polyamides or polyethylene wax; surface improving agents such as silicones; UV absorbers; antioxidants such as hindered phenols or hindered amines; and photostabilizers.

The top coat composition preferably has a viscosity from 30 to 1000 cps at 20° C., a dynamic Tg of higher than 40° C. when cured, and a heat residue of greater than 20% by weight at 500° C. One of characteristic properties of the top coat of the present invention is its water repellency represented by a contact angle with water of greater than 80 degree. This property makes the top coat highly repellent not only against water but also other soiling substances, and easily cleanable if it is soiled with these substances. In addition, the top coat satisfactorily fulfills other properties required therefor such as weatherability, anti-solvent and anti-chemical properties, impact strength, anti-scratch properties and the like because of stable carbon-to-silicon bond created by the crosslinking reaction. The top coat also exhibits a high quality appearance in terms of transparency and gloss. Therefore, the top coat of the present invention is more advantageous than water repellent fluorocarbon top coats known in the prior art.

Coating method

The coating method of the above base coat and top coat compositions may be the same as the conventional method. When finishing, for instance, automobile bodies, the zinc phosphate-treated steel panels are coated with an electrodeposition paint and a midlayer coating composition successively. The multilayer coatings of the present invention are preferably formed on a substrate thus treated. The multilayer coatings of the base and top coats may be formed either by the two coats/one bake method or by the two coats/two bake method. When the two coats/one bake method is employed and the base coat composition is solvent type or the same as the top coat composition as discussed above except that it is pigmented, the base coat composition is applied on the substrate to a dry film thickness of about 10 to 30 microns by spraying or electrostatically. After a suitable length of setting time, the top coat composition is applied wet-on-wet onto the base coat to a dry film thickness of about 20 to 50 microns by the same application method, and then baked both coats at a temperature from 120° to 150° C. simultaneously. When the base coat composition is waterborne, the base coat film is preheated at a temperature below 100° C., for example at 80° C. for about 10 minutes or more for removing water prior to the application of top coat composition. The procedures and conditions are otherwise identical to the procedures and conditions for solvent type base coat compositions.

When the two coats/two bake method is employed, the base coat composition and top coat composition are applied as above but the base coat is baked prior to the application of top coat composition. Of course, the setting or preheating step is omitted. In the two coats/two bake method, it is possible to use as the top coat composition a room temperature-curable or high energy radiation-curable composition. In this case certain modification would be necessary such as addition of a photosensitizer or omitting catalyst retardants. The above applying and baking methods for the top coat can be applied when the above top coat composition is used as an over coat composition applied on conventional multilayer coatings wherein the top coat composition is a conventional acrylic varnish.

The following examples are given for illustrative purposes only. All parts and percents therein are by weight unless otherwised specified.

Production Example 1

Alkenyl group-containing acrylic resin

A reactor equipped with a stirrer, thermometer, reflux condenser, nitrogen gas tube and drip funnel was charged with 150 parts of xylene and heated to 130° C . To this was added dropwise the following monomer mixture at a constant rate over 3 hours.

| Material | Parts |
|---|---|
| 3-Methyl-3-butenyl methacrylate | 50 |
| Cyclohexenyl methacrylate | 40 |
| 2,4-Diphenyl-4-methyl-1-pentene | 10 |
| 2,2'-Azobis(methyl isobutyrate) | 10 |

After the addition, the mixture was allowed to react at 130° C. for 1 hour. Thereafter a solution of 0.5 parts of 2,2'-azobis (methyl isobutyrate) in 10 parts of xylene was added dropwise over 30 minutes. The mixture was allowed to react again at 130° C. for additional 2 hours, cooled to 50° C. and then evaporated at a vacuum of 10 mmHg at 50° C. to obtain Acrylic Resin A having a number average M.W. of 1,460 and a nonvolatile content of 95.2%.

Production Example 2

In situ Polymerization of alkenyl acrylic resin in SiH group-containing silicone A reactor as used in Production Example 1 was charged with 150 parts of xylene and 88.7 parts of an SiH group-containing silicone of the following formula:

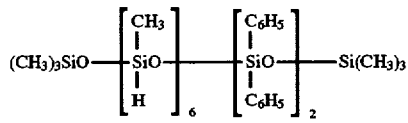

and then the content was heated to 130° C. with nitrogen gas bubbling.

To this was added dropwise the following monomer mixture at a constant rate over 3 hours.

| Material | Parts |
|---|---|
| Cyclohexenylmethyl methacrylate | 50 |
| 2-Ethylhexyl methacrylate | 30 |
| Cyclohexyl methacrylate | 20 |
| 2,2'-Azobis (methyl isobutyrate) | 10 |

Thereafter the mixture was processed as in Production Example 1 to obtain Silicone Acrylic Resin A having a number average M.W. of 1,940 and a nonvolatile content of 82.2%.

Production Example 3

SiH group-containing acrylic resin

A reactor as used in Production Example 1 was charged with 90 parts of SOLVESSO 100 and heated to 130° C. with nitrogen gas bubbling. To this was added dropwise a mixture of 100 parts of silicone macromonomer A of the following average composition formula:

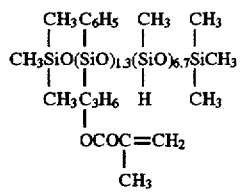

and 10 parts of 2,2'-azobis(methyl isobutyrate) at a constant rate over 3 hours. Thereafter the mixture was processed as in Production Example 1 to obtain Silicone Acrylic Resin B having a number average molecular weight 2,250 and a nonvolatile content of 85.3%.

Production Example 4

SiH group-containing acrylic resin

A reactor as used in Production Example 1 was charged with 90 parts of xylene and heated to 120° C. with nitrogen gas bubbling. To this was added dropwise a mixture of 43 parts of silicone macromonomer B, 48 parts of silicone macromonomer C, each having an average composition formula shown below, 9 parts of 2-ethylhexyl methacrylate and 10 parts of 2,2'-azobis (methyl isobutarate) at a constant rate over 3 hours. Thereafter the mixture was processed as in Production Example 1 to obtain Silicone Acrylic Resin C having a number M.W. of 4,230 and a nonvolatile content of 86.3%.

Silicone macromonomer B:

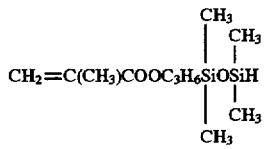

Silicone macromonomer C:

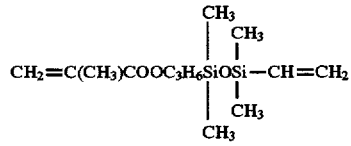

Production Example 5

Alkenyl group-containing polycarbonate resin

A reactor equipped with a stirrer, thermometer, decanter and nitrogen gas tube was charged with 28.8 parts of cyclohexanedimethanol, 151.2 parts of dimethyl carbonate and 0.56 parts of tetraisopropoxytitanium. The inner temperature was raised to an initial temperature of 90° C., then to 100° C. over 2 hours and finally to 140° C. over 4 hours. 11.3 parts of methanol and 120 parts of unreacted dimethyl carbonate were recovered during this period of time. After cooling the reaction mixture to 100° C. , 15.4 parts of pentaerythritol triallyl ether were added and allowed to react at 150° C. for 5 hours. Polycarbonate Resin A having a number average M.W. of 1,210 and a nonvolatile content of 95.3% was obtained.

Production Example 6

Alkenyl group-containing polyester resin

A reactor as used in Production Example 5 was charged with 61.8 parts of dimethyl phthalate, 29.5 parts of neophentyl glycol hydroxypivalic acid ester, 9.6 parts of trimethylolpropane and 0.05 parts of dibutyltin oxide. The inner temperature was raised initially to 100° C. , then to 180° C. over 1 hour and finally to 210° C. over 4 hours. 10.8 parts of methanol were recoverd during this period of time. After cooling the reaction mixture to 100° C. , 18.3 parts of glycerol dially ether were added and allowed to react by heating to an initial temperature of 150° C. and then 220° C. over 2 hours. The reaction was continued for additional 3 hours at the same temperature, during which period of time 7.1 parts of methanol were recovered. Polyester Resin A having a number average M.W. of 2,550 and a nonvolatile content of 90.4% was obtained.

Production Example 7

SiH group-containing acrylic resin

A reactor as used in Production Example 1 was charged with 90 parts of xylene and heated to 130° C. with nitrogen gas bubbling. To this was added dropwise a mixture of 50 parts of silicone macromonomer A (See, Proudction Example 3), 50 parts of t-butyl methacrylate and 6 parts of 2,2'- azobis(methyl isobutyrate) at a constant rate over 3 hours. Thereafter the mixture was processed as in Production Example 1 to obtain Silicone Acrylic Resin D having a number average M.W. of 3,470 and a nonvolatile content of 88.2%.

Production Example 8

SiH group-containing acrylic resin

A reactor as used in Production Example 1 was charged with 90 parts of SOLVESSO 100 and heated to 130° C. with nitrogen gas bubbling. To this was added dropwise a mixture of 20 parts of silicone macromonomer A, 48 parts of silicone macromonomer B (See, Production Example 4), 32 parts of cyclohexyl methacrylate and 6 parts of 2,2'-azobis(methyl isobutyrate) at a constant rate over 3 hours. Thereafter the mixture was processed as in Production Example 1 to obtain silicone Acrylic Resin E having a number average M.W. of 3,410 and a nonvolatile content of 84.2%.

Production Example 9

SiH group-containing acrylic resin

A reactor as used in Production Example 1 was charged witn 90 parts of SOLVESSO 100 and heated to 130° C. with nitrogen gas bubbling. To this was added dropwise a mixture of 50 parts of silicone macromonomer B, 50 parts of cyclohexyl methacrylate and 3 parts of 2,2'-azobis(methyl isobutyrate) at a constant rate over 3 hours. Thereafter the mixture was processed as in Production Example 1 to obtain Silicone Acrylic Resin F having a number average M.W. of 3,170 and a nonvolatile content of 78.5%.

Production Example 10

Alkenyl group-containing acrylic resin

A reactor as used in Production Example 1 was charged with 150 parts of SOLVESSO 100 and heated to 130° C. with nitrogen gas bubbling. To this was added dropwise a monomer mixture shown below at a constant rate over 3 hours.

| Material | Parts |
|---|---|
| Allyl methacrylate | 40 |
| Cyclohexyl methacrylate | 40 |
| 2-Ethylhexyl methacrylate | 10 |
| 2,4-Diphenyl-4-methyl-1-pentene | 10 |
| 2,2'-Azobis(methyl isobutyrate) | 10 |

Thereafter the mixture was processed as in Production Example 1 to obtain Acrylic Resin B having a number average M.W. of 4,870 and a nonvolatile content of 90.3%.

Production Example 11

| Solvent type metallic base coat composition | |
|---|---|
| Material | Parts |
| ALUPASTE 7160N (aluminum flake paste sold by Toyo Aluminum Co., Ltd., Al flake content 65%) | 10.9 |
| ARUMATEX NT-U-448 (thermosetting acrylic varnish sold by Mitsui Toatsu Chemicals, Inc, 48% solids) | 66.9 |
| YUBAN 20N-60 (melamin resin varnish sold by Mitsui Toatsu Chemicals, Inc., 60% solids) | 13.5 |
| Toluene | 6.4 |
| n-Butanol | 2.0 |
| Triethylamine | 0.5 |

Production Example 12

| Waterborne metallic base coat composition | |
|---|---|
| Material | Parts |
| ALUPASTS 7160N | 15 |
| CYMEL 303 (melamine resin sold by Mitsui Toatsu Chemicals, Inc.) | 30 |
| PHOSPHOREX A-180L (isostearyl phosphate sold by Sakai Chemical Industry Co., Ltd.) | 2 |
| Aqueous acrylic varnish* | 112 |
| Polyurethane emulsion (33% solids, acid number 16.2) | 43 |

*An aqueous varnish (50% solids) of an acrylic resin having an Mn of 12,000, OH number of 70 and acid number of 58 produced by polymerizing the following monomer mixture.

| | |
|---|---|
| Butylcellosolve | 76 |
| Styrene | 15 |
| Methyl methacrylate | 63 |
| 2-Hydroxylethyl methacrylate | 48 |
| n-Butyl acrylate | 117 |
| Methacrylic acid | 27 |
| Acrylamide | 30 |
| Azobisbutyronitrile | 3 |
| Dimethylethanolamine | 28 |
| Deionized water | 200 |

Production Example 13

| Solvent type solid color base coat composition | |
|---|---|
| Material | |
| Carbon black (DEGUSSA FM-200P) | 2.3 |
| Polyester resin[1] | 27.1 |
| Alkyd resin[2] | 38.2 |
| YUBAN 128 (melamine resin sold by Mitsui Toatsu Chemicals, Inc.) | 20.7 |

-continued

| | |
|---|---|
| DISPERON KS-281 (dispersant sold by Kusumoto Kasei Co., Ltd.) | 0.3 |
| MODAFLOW solution (Monsanto) | 0.1 |
| Triethylamine | 0.3 |
| n-Butanol | 3.3 |
| SOLVESSO 100 | 7.7 |

[1] Acid number 5, OH number 80, Mn 3,380
[2] Acid number 8, OH number 110, Mn 2,700, oil length 20.

Production Example 14

Solvent-free silicone metallic base coat composition

| Material | Parts |
|---|---|
| ALUPASTE 7160N | 10.9 |
| HP-1030 (Daicel Chemical Industries, Ltd.) | 20.1 |
| SiH containing silicone[1] | 20.1 |
| Pt catalyst[2] | 0.4 |
| OLUFIN B[3] | 0.4 |

[1] Organohydrogenpolysiloxane of the formula:

$$(CH_3)_3SiO \text{---} \left[ \begin{array}{c} CH_3 \\ | \\ SiO \\ | \\ H \end{array} \right]_6 \left[ \begin{array}{c} C_6H_5 \\ | \\ SiO \\ | \\ C_6H_5 \end{array} \right]_2 \text{---} Si(CH_3)_3$$

EXAMPLES 1–16

Substrate

A zinc phosphate-treated steel plate of 0.8 mm thickness was coated with an cathodic electrodeposition paint (POWER TOP PU-50, Nippon Paint Co., Ltd.) to a dry film thickness of about 25 μm, rinsed with water and pre-heated. Then a midlayer paint (ORGA P-2 sealer; Nippon Paint Co., Ltd.) was sprayed thereon to a dry film thickness of about 40 μm and baked at 140° C. for 30 minutes.

Base coat

In Examples 3, 5–7, and 13, the base coat composition (solvent type and solvent-free metallic) was sprayed to a dry film thickness of about 15 μm, allowed to set for about 7 minutes. Then the top coat composition was applied thereon wet-on-wet.

In Examples 1, 2, 10, 11, 14 and 16, the base coat composition (waterborne metallic) was adjusted to a Ford cup #4 viscosity of 30 seconds, sprayed to a dry film thickness of about 15 μm in two stages and pre-heated at 80° C. for 5 minutes. Then the top coat compositions was applied thereon wet-on-wet.

In Examples 4, 8, 9, 12 and 15, the base coat composition (solvent type solid color) was sprayed to a dry film thickness of about 30 μm, allowed to set for about 7 minutes and baked at 140° C. for 25 minutes. Thereafter the top coat composition was applied.

Formulation of top coat composition

EXAMPLE 1

| Material | Parts |
|---|---|
| HPE-1030[1] | 50 |
| SiH containing silicone[2] | 50 |
| Pt catalyst A[3] | 1.0 |
| SEESORB-103[4] | 5 |
| IRGANOX 1010[5] | 2 |
| OLUFIN B[6] | 1 |
| Nonvolatiles, % | 97.8 |

-continued

| Material | Parts |
|---|---|
| Viscosity, CP at 20° C. | 68 |
| SiH/Alkenyl molar ratio | 1/1 |

[1] An alkenyl compound of the formula:

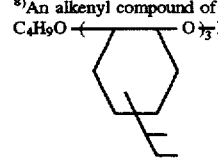

[2] A silicone of the formula:

$$(CH_3)_3SiO \text{---} \left[ \begin{array}{c} CH_3 \\ | \\ SiO \\ | \\ H \end{array} \right]_6 \left[ \begin{array}{c} C_6H_5 \\ | \\ SiO \\ | \\ C_6H_5 \end{array} \right]_2 \text{---} Si(CH_3)_3$$

[3] $H_2PtCl_6 \cdot 6H_2O$, 2% isopropanol solution
[4] A benzophenone type photostabilizer sold by Shipro Kasei Co., Ltd.
[5] A hindered phenol antioxidant sold by Ciba-Geigy
[6] 3-methyl-1-butyne-1-ol sold by Nisshin Chemical Industry Co., Ltd.

EXAMPLE 2

| Material | Parts |
|---|---|
| Acrylic Resin A (Pro.Ex.1) | 58 |
| SiH containing silicone A | 43 |
| Pt catalyst A | 1.5 |
| IRGANOX 1010 | 2 |
| OLUFIN B | 1 |
| Nonvolatiles, % | 97.7 |
| Viscosity, CP at 20° C. | 565 |
| SiH/Alkenyl molar ratio | 3/2 |

EXAMPLE 3

| Material | Parts |
|---|---|
| Silicone Acrylic Resin A (Pro.Ex.2) | 122 |
| Pt catalyst B[7] | 1.5 |
| OLUFIN B | 1 |
| Nonvolatiles, % | 84.3 |
| Viscosity, CP at 20° C. | 320 |
| SiH/Alkenyl molar ratio | 2/1 |

[7] Harnder T-50 sold by Shin-Etsu Chemical Co., Ltd

EXAMPLE 4

| Material | Parts |
|---|---|
| HPE-1060[8] | 61 |
| SiH containing silicone C[9] | 39 |
| Ru catalyst[10] | 4 |
| TINUBIN 900[11] | 2 |
| ALCH[12] | 5 |
| Nonvolatiles, % | 92.5 |
| Viscosity, CP at 20° C. | 120 |
| SiH/Alkenyl molar ratio | 1/1 |

[8] An alkenyl compound of the formula:

-continued

| Material | Parts |
|---|---|
| 9) A silicone of the formula: | |

$$\text{CH}_3-\underset{\underset{\text{O}}{|}}{\overset{\overset{\text{H}}{|}}{\text{Si}}}-\text{CH}_3$$

$$\left[\begin{array}{c}\text{SiO}\\|\\\text{O}\end{array}\right]_3$$

$$\text{CH}_3-\underset{\underset{\text{H}}{|}}{\overset{|}{\text{Si}}}-\text{CH}_3$$

10) RU$_3$(CO)$_{12}$ cluster complex, cluster size 0.59 nm, 5% THF solution.
11) Hindered amine UV absorber sold by Ciba-Geigy.
12) Ethyl acetoacetate aluminum isopropylate

EXAMPLE 5

| Material | Parts |
|---|---|
| HPE-1030 | 44 |
| Silicone Acrylic Resin B (Pro.Ex.3) | 67 |
| Pt catalyst A | 1.5 |
| TINUBIN 900 | 2 |
| SANOL LS-292[13] | 1 |
| ALCH | 5 |
| OLUFIN B | 1 |
| Nonvolatiles, % | 90.3 |
| Viscosity, CP at 20° C. | 80 |
| SiH/Alkenyl molar ratio | 1/1 |

13) Hindered amine sold by Sankyo Yuki Gosei Co., Ltd.

EXAMPLE 6

| Material | Parts |
|---|---|
| Silicone Acrylic Resin C (Pro.Ex.4) | 125 |
| Rh catalyst[14] | 1.0 |
| ALCH | 5 |
| Nonvolatiles, % | 82.3 |
| Viscosity, CP at 20° C. | 280 |
| SiH/Alkenyl molar ratio | 1/1.5 |

14) RhCl$_2$(cod)$_2$, 2% isopropanol solution, "cod": cyclooctadiene

EXAMPLE 7

| Material | Parts |
|---|---|
| HPE-1030 | 61 |
| SiH containing silicone A | 45 |
| Pt catalyst B | 0.5 |
| SEESORB-103 | 3 |
| TINUBIN 900 | 2 |
| SANOL LS-292 | 1 |
| Nonvolatiles, % | 96.5 |
| Viscosity, CP at 20° C. | 85 |
| SiH/Alkenyl molar ratio | 9/11 |

EXAMPLE 8

| Material | Parts |
|---|---|
| HPE-1060 | 61 |
| SiH containing silicone C | 39 |
| Pt catalyst C[15] | 1.5 |
| Nonvolatiles, % | 97.2 |
| Viscosity, CP at 20° C. | 110 |
| SiH/Alkenyl molar ratio | 1/1 |

15) CpPt (CH$_3$)$_2$, 2% THF solution, "Cp": cyclopentadiene.

EXAMPLE 9

| Material | Parts |
|---|---|
| HPE-1060 | 61 |
| SiH containing silicone C | 39 |
| Pt catalyst A | 1.5 |
| Alkynyl compound[16] | 0.5 |
| Nonvolatiles, % | 96.5 |
| Viscosity, CP at 20° C. | 108 |
| SiH/Alkenyl molar ratio | 1/1 |

16) 3-Trimethylsiloxy-3,3-dimethylpropyne.

EXAMPLE 10

| Material | Parts |
|---|---|
| Polycarbonate Resin A (Pro.Ex.5) | 56 |
| SiH containing silicone A | 45 |
| Pt catalyst A | 1.5 |
| SEESORB-103 | 5 |
| IRGANOX 1010 | 2 |
| OLUFIN B | 5 |
| Nonvolatiles, % | 93 |
| Viscosity, CP at 20° C. | 83 |
| SiH/Alkenyl molar ratio | 1/1 |

EXAMPLE 11

| Material | Parts |
|---|---|
| Polycarbonate Resin A (Pro.Ex.5) | 65 |
| SiH containing silicone A | 41 |
| Pt catalyst A | 1.5 |
| IRGANOX 1010 | 2 |
| OLUFIN | 2 |

EXAMPLE 12

| Material | Parts |
|---|---|
| Cyclohexanedimethanol divinyl ether | 29 |
| Silicone Acrylic Resin D (Pro.Ex.7) | 41 |
| Pt catalyst A | 1.5 |
| IRGANOX 1010 | 2 |
| OLUFIN B | 2 |
| Nonvolatiles, % | 93 |
| Viscosity, CP at 20° C. | 90 |
| SiH/Alkenyl molar ratio | 2/1 |

EXAMPLE 13

| Material | Parts |
| --- | --- |
| Silicone Acrylic Resin E (Pro.Ex,8) | 119 |
| Pt catalyst B | 1.5 |
| OLUFIN B | 5 |

EXAMPLE 14

| Material | Parts |
| --- | --- |
| 1,3,5,7-tetravinyltetramethyltetrasiloxane | 15 |
| Silicone Acrylic Resin F (Pro.Ex.9) | 109 |
| Ru catalyst | 8.0 |
| Nonvolatiles, % | 84.3 |
| Viscosity, CP at 20° C. | 920 |
| SiH/Alkenyl molar ratio | 1/1 |

EXAMPLE 15

| Material | Parts |
| --- | --- |
| Alkenyl group-containing B (Pro.Ex.10) | 69 |
| SiH containing silicone C | 31 |
| Pt catalyst C | 1.5 |
| Alkynyl compound A | 0.5 |
| Nonvolatiles, % | 88.3 |
| Viscosity, CP at 20° C. | 720 |
| SiH/Alkenyl molar ratio | 1.2/1 |

EXAMPLE 16

| Material | Parts |
| --- | --- |
| Triethyleneglycol divinyl ether | 29 |
| Silicone Acrylic Resin D (Pro.Ex.7) | 73 |
| Pt catalyst C | 1.5 |
| OLUFIN B | 1.2 |
| Nonvolatiles, % | 97.1 |
| Viscosity, CP at 20° C. | 103 |
| SiH/Alkenyl molar ratio | 1/1 |

Application of top coat composition

In Examples 1–6, 8–14 and 16, the top coat composition was adjusted at a Ford cup #4 viscosity of 20–30 seconds, sprayed on the base coat to a dry film thickness of about 40 μm and then cured under the conditions shown in Table 1 and Table 2.

In Examples 7 and 15, the hydrosilyl resin component and the alkenyl resin component containing premixed catalyst and additives were adjusted to a Ford cup # viscosity of 20 seconds separately. Then these two components were sprayed concurrently onto the base coat to a dry film thickness of about 40 μm using a double head spray gun, and cured under the conditions shown in Table 1 and Table 2.

Heat curing was carried out at 180° C. for 25 minutes in Example 4, at 120° C. for 25 minutes in Example 5, and at 140° C. for 25 minutes in other Examples. Room temperature curing was carried out for 7 days. UV curing was carried out by irradiating coated films with UV ray at a dose of 500 mJ/cm$^2$ for 1 second using a high pressure mercury lamp placed at a distance of 8 cm. After curing, each top coat was tested for various properties. The results are shown in Table 1 and Table 2. All top coats of Examples 1–16 showed a gloss greater than 90 and satisfactory flow and distinctness.

Test method

Water contact angle

Using a syringe, one drop of water was placed on the top coat and the contact angle was determined by a contact angle meter.

Dynamic Tq

A temperature at which dispersion of tan δ with temperature is maximun in the dynamic viscoelasticity test at a frequency of 11 Hz at a temperature elevation rate of 2° C./minutes.

TG 500° C.

Percent Residual weight at 500° C. in the thermal weigh measurement in the pneumatic atmosphere at a temperature elevation rate of 10° C./minutes.

Anti-scratch property

A piece of flannel fabric of 2×2 cm size was impregnated with 1 g of 50% aqueous dispersion of a commercial cleanser powder (NEW FOAMING CLEANSER sold by Kao Corporation) and mounted to the reciprocating head of a Gakushin type fabric color fastness tester. The coated specimen was rubbed with the fabric at 20 reciprocations under a load of 500 g and % retention of gloss was determined at an angle of 20°. The anti-scratch property was evaluated according to the following schedule:

| Very good: | greater than 85% retention |
| --- | --- |
| Good: | 70–85% retention |
| Bad: | less than 40% retention |

Acid resistance 0.2 ml of 0.1N H$_2$SO$_4$ solution was contacted with the specimen surface at 60° C. for 2 hours. The change of appearance was visually examined and evaluated according to the following schedule:

| Very good: | A slight trace was observed. |
| --- | --- |
| Fair: | A remarkable trace was observed. |
| Bad: | Film was destroyed. |

TABLE 1

| Item | EXAMPLE | | | | | | | |
| --- | --- | --- | --- | --- | --- | --- | --- | --- |
|  | 1 | 2 | 3 | 4 | 5 | 6 | 7 | 8 |
| Base coat | Waterborne metallic | " | " | " | " | " | Silicone metallic | Solvent solid |
| Coating method | 2C1B | 2C1B | 2C1B | 2C1B | 2C1B | 2C1B | 2C1B | 2C2B |
| Curing method | Heat | Heat | Heat | Heat | Heat | Heat | Heat | Heat |
| Contact angle, H$_2$O (°) | 90 | 89 | 91 | 90 | 85 | 82 | 85 | 91 |

TABLE 1-continued

| | EXAMPLE | | | | | | | |
|---|---|---|---|---|---|---|---|---|
| Item | 1 | 2 | 3 | 4 | 5 | 6 | 7 | 8 |
| Dynamic Tg, °C. | 89 | 71 | 58 | 80 | 123 | 78 | 95 | 110 |
| TG 500° C., % | 52 | 49 | 50 | 38 | 39 | 31 | 50 | 39 |
| Scratch resistance | Very good | " | " | " | " | " | " | " |
| Acid resistance | Very good | " | " | " | " | " | " | " |

TABLE 2

| | EXAMPLE | | | | | | | |
|---|---|---|---|---|---|---|---|---|
| Item | 9 | 10 | 11 | 12 | 13 | 14 | 15 | 16 |
| Base coat | Solvent solid | Waterborne metallic | " | Solvent solid | Solvent metallic | Waterborn metallic | Solvent solid | Waterborne metallic |
| Coating method | 2C2B | 2C1B | 2C1B | 2C2B | 2C1B | 2C1B | 2C2B | 2C1B |
| Curing method | RT | Heat | Heat | Heat | Heat | Heat | RT | Heat |
| Contact angle, H$_2$O (°) | 90 | 81 | 83 | 83 | 91 | 85 | 90 | 80 |
| Dynamic Tg, °C. | 105 | 76 | 72 | 72 | 59 | 96 | 130 | 41 |
| TG 500° C., % | 38 | 51 | 48 | 35 | 41 | 31 | 34 | 31 |
| Scratch resistance | Very good | Good | " | " | " | " | " | " |
| Acid resistance | Good | Very good | " | " | " | " | " | " |

Comparative Example 1

| Clear coat formulation | |
|---|---|
| Material | Parts |
| DAIANAL HR-554 (thermosetting acrylic varnish sold Mitsuibishi Rayon Co., Ltd., 60% solids) | 58.3 |
| ACR-461 (thermosetting acrylic varnish sold by Nippon Paint Co., Ltd., 55% solids) | 63.6 |
| YUBAN 20N-60 | 50.0 |
| TINUBIN 900 | 2.0 |
| SANOL LS-292 | 1.0 |
| n-Butanol | 1.3 |
| SOLVESSO 100 | 5.0 |

Comparative Example 2

| Clear coat formulation | |
|---|---|
| Material | Parts |
| Fluorocarbon resin (LUMIFLON LF-916 sold by Asahi Glass Co., Ltd. 65% solids) | 15.0 |
| DAIANAL HR-554 | 32.0 |
| Acrylic resin varnish (acid number 20, OH number 70, 56% solids, Mn 7,300, Tg 25° C.) | 17.0 |
| YUBAN 20N-60 | 15.0 |
| SUPER BEKKAMIN 13-548 (melamine resin sold by Dainippon Ink And Chemical, Inc.) | 15.0 |
| TINUBIN 900 | 1.0 |
| SANOL LS-292 | 0.5 |
| SOLVESSO 150 | 7.0 |
| n-Butanol | 5.0 |
| Nonvolatiles | 38.2% |

As in Examples 3, 5–6 and 13, the top coat composition was applied on the base coat wet-on-wet to a dry film thickness of about 40 μm and baked both coats simultaneously. Evaluation of the top coat thus formed was carried out as in Examples. The results are shown in Table 3.

EXAMPLE 17

The clear coat composition of Example 1 was applied on the multilayer coatings formed in Comparative Example 1 and cured under the same conditions as in Example 1. The properties of over coat film thus produced are shown in Table 3.

TABLE 3

| | Comparative Example | | Example |
|---|---|---|---|
| Item | 1 | 2 | 17 |
| Base coat | Solvent solid | Solvent metallic | Multilayer coatings of Comp. Ex. 1 |
| Coating method | 2C1B | 2C1B | 3C2B |
| Curing method | Heat | Heat | RT |
| Contact angle, H$_2$O (°) | 76 | 92 | 90 |
| Dynamic Tg, °C. | 65 | 67 | 89 |
| TG 500° C., % | 4 | 3 | 52 |
| Scratch resistance | Bad | Bad | Very good |
| Acid resistance | Bad | Fair | Very good |

What is claimed is:

1. In a method of forming multilayer coatings on a substrate comprising applying a pigmented base coat composition onto said substrate, applying a clear top composition onto said base coat, and curing both coats individually or simultaneously, the improvement wherein said clear top coat composition comprises (a) a blend of a resin having a plurality of hydrosilyl groups in the molecule and polyether or polycarbonate resin having a plurality of alkenyl groups in the molecule; and (b) a catalytically effective amount of a hydrosilylation catalyst.

2. The method according to claim 1 wherein said base coat composition is the same as said clear top coat composition except that it is pigmented.

3. The method according to claim 1 wherein said clear top coat composition is applied on said base coat after said base coat has been cured.

4. The method according to claim 1 wherein said clear top coat composition is applied on said base coat wet-on-wet, and both of said top and base coats are cured simultaneously.

5. The method according to claim 1 wherein said substrate is automobile body.

6. The method according to claim 1 wherein said resin having a plurality of hydrosilyl groups is a polysiloxane having one of the following formula I, II and III:

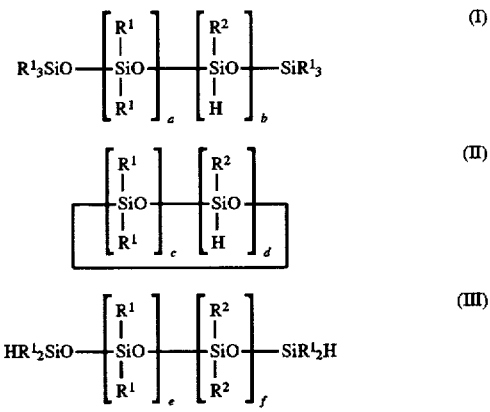

wherein $R^1$ and $R^2$ are independly a $C_1$–$C_6$ alkyl, phenyl or phenethyl; a is zero or an integer up to 100; b is an integer from 2 to 100; c is zero or an integer up to 8 and d is an integer from 2 to 10 with the proviso that the sum of c+d equals 3 to 10; e is an integer from 2 to 100; and f is zero or an integer up to 100.

7. The method according to claim 1 wherein said resin having a plurality of hydrosilyl groups is a homo- or copolymer of a hydrogenpolysiloxane macromonomer having one of the following average composition formulas IV, V and VI:

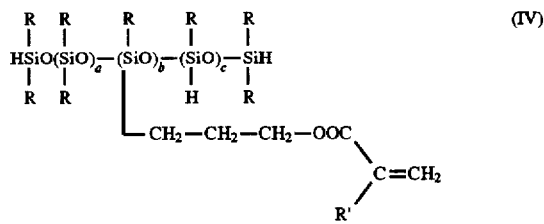

wherein R, R', and a and b are as defined, and d is a real number of from 1 to 10; and

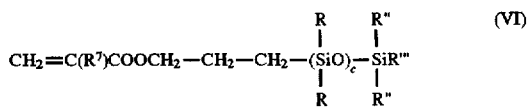

wherein R, R' and c are as defined, R" is the same as R or a group —OSi(R)$_2$H, and R'" is hydrogen when R" is the same as R or otherwise a group —OSi(R)$_2$H.

8. The method according to claim 1 wherein said hydrosilylation catalyst is a platinum, rhodium, paradium or ruthenium compound.

9. The method according to claim 1 wherein the molar ratio of said hydrosilyl group to said alkenyl group in said clear top coat composition is from 0.3 to 3.0.

10. The method according to claim 1 wherein said clear top coat composition has a nonvolatile content greater than 60% by weight.

11. In a method of forming multilayer coatings on a substrate comprising applying a pigmented base coat composition onto said substrate, applying a clear top composition onto said base coat, curing both coats individually or simultaneously, applying a clear over coat composition onto said top coat, and curing said over coat, the improvement wherein said clear over coat comprises (a) a blend of a resin having a plurality of hydrosilyl groups in the molecule and a polyether or polycarbonate resin having a plurality of alkenyl groups in the molecule; and (b) a catalytically effective amount of hydrosilylation catalyst.

12. The method according to claim 11 wherein said clear top coat composition is applied onto said base coat wet-on-wet and cured simultaneously with said base coat.

13. The method according to claim 11 wherein said substrate is an automobile body.

14. The method according to claim 11 wherein said resin having a plurality of hydrosilyl groups is a polysiloxane having one of the following formula I, II and III:

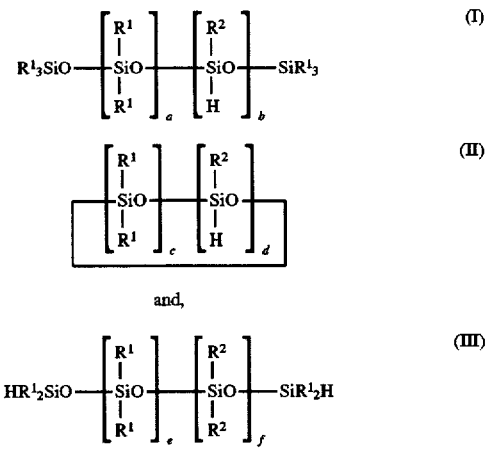

wherein $R^1$ and $R^2$ are independly a $C_1$–$C_6$ alkyl, phenyl or phenethyl; a is zero or an integer up to 100; b is an integer from 2 to 100; c is zero or an integer up to 8 and d is an integer from 2 to 10 with the proviso that the sum of c+d equals 3 to 10; e is an integer from 2 to 100; and f is zero or an integer up to 100.

15. The method according to claim 11 wherein said resin having a plurality of hydrosilyl groups is a homo- or copolymer of a hydrogenpolysiloxane macromonomer having one of the following average composition formulas IV, V and VI:

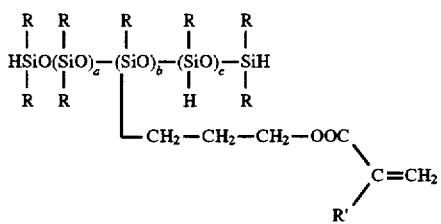
(IV)

wherein R is a $C_1$–$C_6$ alkyl or phenyl, R' is hydrogen or methyl, a is a real number of from 0 to 20, b is a real number of from 0.5 to 3, and c is a real number of from 0 to 10;

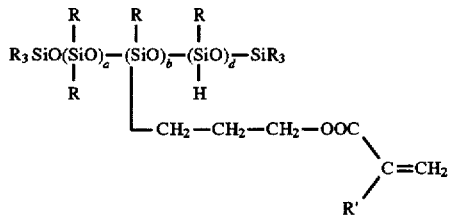
(V)

wherein R, R', and a and b are as defined, and d is a real number of from 1 to 10; and

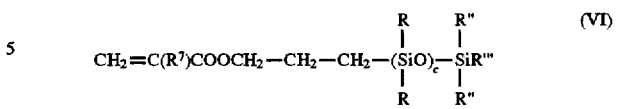
(VI)

wherein R, R' and c are as defined, R" is the same as R or a group —$OSi(R)_2H$, and R'" is hydrogen when R" is the same as R or otherwise a group —$OSi(R)_2H$.

16. The method according to claim 11 wherein said hydrosilylation catalyst is a platinum, rhodium, paradium or ruthenium compound.

17. The method according to claim 11 wherein the molar ratio of said hydrosilyl group to said alkenyl group in said clear over coat composition is from 0.3 to 3.0.

18. The method according to claim 11 wherein said clear over coat composition has a nonvolatile content greater than 60% by weight.

* * * * *